United States Patent
Ishikawa

(10) Patent No.: US 12,371,530 B2
(45) Date of Patent: Jul. 29, 2025

(54) METHOD FOR PRODUCING POLYCARBONATE RESIN, AND MOLDED BODY

(71) Applicant: MITSUBISHI GAS CHEMICAL COMPANY, INC., Tokyo (JP)

(72) Inventor: Shun Ishikawa, Ibaraki (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 700 days.

(21) Appl. No.: 17/642,458

(22) PCT Filed: Sep. 15, 2020

(86) PCT No.: PCT/JP2020/034809
§ 371 (c)(1),
(2) Date: Mar. 11, 2022

(87) PCT Pub. No.: WO2021/054300
PCT Pub. Date: Mar. 25, 2021

(65) Prior Publication Data
US 2022/0298300 A1    Sep. 22, 2022

(30) Foreign Application Priority Data
Sep. 18, 2019  (JP) .................. 2019-169653

(51) Int. Cl.
*C08G 64/04*    (2006.01)
*C08G 64/24*    (2006.01)

(52) U.S. Cl.
CPC .......... *C08G 64/04* (2013.01); *C08G 64/24* (2013.01)

(58) Field of Classification Search
CPC .................................................. C08G 64/04
See application file for complete search history.

(56) References Cited

U.S. PATENT DOCUMENTS 4,533,722 A  *  8/1985  Campbell .............. C08G 64/24
                                                      528/196
5,409,975 A      4/1995  Nishiguichi et al.
(Continued)

FOREIGN PATENT DOCUMENTS

EP    0 608 493 A2    8/1994
EP    2 712 880 A1    4/2014
(Continued)

OTHER PUBLICATIONS

JP 2003/286213 A (JPO transl.) (Year: 2003).*
(Continued)

*Primary Examiner* — Nicole M. Buie-Hatcher
(74) *Attorney, Agent, or Firm* — GREENBLUM & BERNSTEIN P.L.C.

(57) ABSTRACT

The present application addresses the problem of providing a new method for producing a polycarbonate resin having excellent properties. This problem has been solved by providing a method for producing a polycarbonate resin containing a constituent unit derived from an aromatic dihydroxy compound represented by formula (1). The method includes polymerizing the aromatic dihydroxy compound represented by formula (1). During the polymerization, a raw material substance is used in which the concentration of compounds represented by formula (2), which are impurities, is 80 ppm or less relative to the total weight of the aromatic dihydroxy compound represented by formula (1) and the compounds represented by formula (2). (In formula (1) and formula (2), $R_1$ to $R_3$, X, a, b, m and n are as described in the description of the present application.)

(Continued)

Relationship between concentration of specific impurities in raw material substance and b* value of PC resin ● Examples
▲ Comparative example

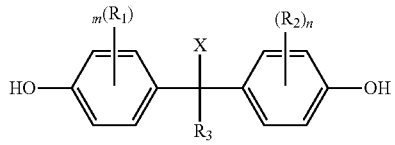

(1)

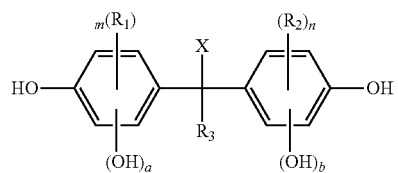

(2)

6 Claims, 1 Drawing Sheet

(56) References Cited

U.S. PATENT DOCUMENTS

| | | |
|---|---|---|
| 5,556,904 A | 9/1996 | Nishiguichi et al. |
| 9,353,216 B2 | 5/2016 | Isahaya et al. |
| 10,053,537 B2 | 8/2018 | Isahaya et al. |
| 2010/0047703 A1* | 2/2010 | Tajima .................. C08G 64/06 528/226 |
| 2014/0206826 A1 | 7/2014 | Isahaya et al. |
| 2015/0337079 A1* | 11/2015 | Ogawa ................ C08G 63/193 528/194 |
| 2016/0264726 A1 | 9/2016 | Isahaya et al. |
| 2017/0174833 A1 | 6/2017 | Isahaya et al. |

FOREIGN PATENT DOCUMENTS

| | | | |
|---|---|---|---|
| JP | 2003286213 A | * | 10/2003 |
| JP | 2004-250551 A | | 9/2004 |
| JP | 2011-219636 A | | 11/2011 |
| JP | 2016-148047 A | | 8/2016 |
| JP | 2018-123197 A | | 8/2018 |
| WO | 2012/157766 A1 | | 11/2012 |

OTHER PUBLICATIONS

International Search Report and Written Opinion of the International Searching Authority issued in International Patent Application No. PCT/JP2020/034809, dated Nov. 17, 2020, along with an English translation thereof.

* cited by examiner

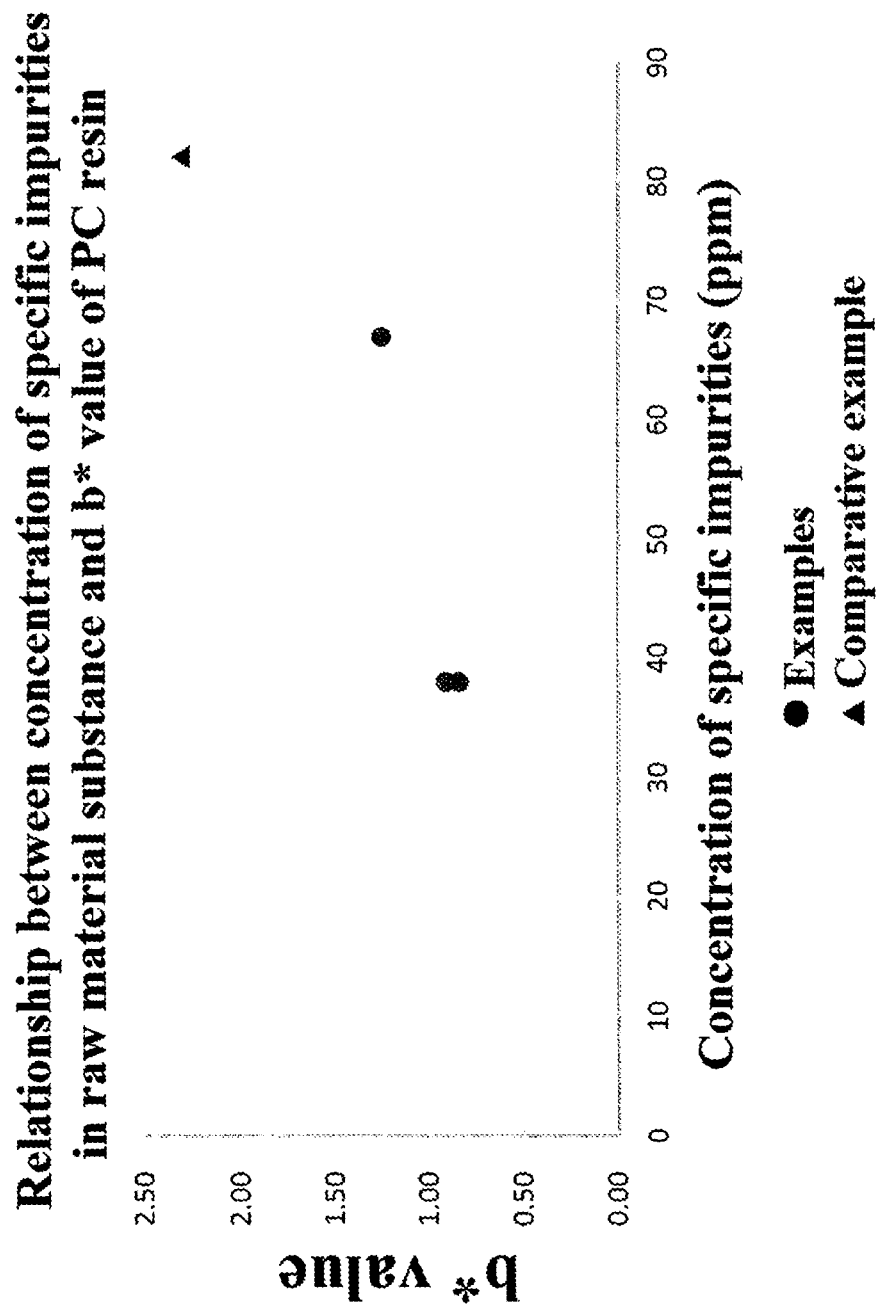

METHOD FOR PRODUCING POLYCARBONATE RESIN, AND MOLDED BODY

TECHNICAL FIELD

The present invention relates to a method for producing a polycarbonate resin and the like.

BACKGROUND ART

As conventional methods for producing a polycarbonate resin, methods comprising a step of polymerizing a bisphenol compound, i.e., a raw material monomer, or the like, are known (for example, Patent literature 1).

PRIOR ART DOCUMENTS

Patent Documents

Patent literature 1: Japanese Unexamined Patent Application Publication No. 2003-286213

SUMMARY OF THE INVENTION

Problems to be Solved by the Invention

The properties of polycarbonate resins resulting from the conventional polycarbonate resin production methods were not always satisfactory. For example, according to some conventional production methods, the properties of the produced polycarbonate resins including hue, melt tension and the like are poor.

Thus, development of a novel production method that ensures generation of a polycarbonate resin having excellent properties has been desired.

Means for Solving the Problems

The present invention provides a method for producing a polycarbonate resin and the like as follows.

(I) A method for producing a polycarbonate resin containing a structural unit derived from an aromatic dihydroxy compound represented by Formula (1) below, the method comprising a polymerization step for polymerizing the aromatic dihydroxy compound represented by Formula (1),
wherein a raw material substance, in which a concentration of a compound represented by Formula (2) below, i.e., impurities, is 80 ppm or less relative to the total weight of the aromatic dihydroxy compound represented by Formula (1) and the compound represented by Formula (2), is used in the polymerization step:

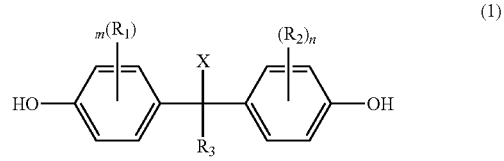

(in Formula (1),
$R_1$ and $R_2$ each independently represent a hydrogen atom, a halogen atom, an optionally substituted and optionally branched C1-C20 alkyl group, or an optionally substituted C6-C30 aryl group, $R_3$ represents a hydrogen atom, an optionally substituted and optionally branched C1-C20 alkyl group, or an optionally substituted C6-C30 aryl group, X represents an optionally branched C1-C20 alkyl group, C1-C20 alkynyl group, C1-C20 alkenyl group or C6-C30 aryl group, which may be substituted with a halogen atom, and m and n each independently represent an integer of 0-2);

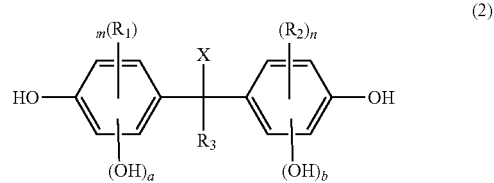

(in Formula (2),
$R_1$ and $R_2$ each independently represent a hydrogen atom, a halogen atom, an optionally substituted and optionally branched C1-C20 alkyl group, or an optionally substituted C6-C30 aryl group, $R_3$ represents a hydrogen atom, an optionally substituted and optionally branched C1-C20 alkyl group, or an optionally substituted C6-C30 aryl group, X represents an optionally branched C1-C20 alkyl group, C1-C20 alkynyl group, C1-C20 alkenyl group or C6-C30 aryl group, which may be substituted with a halogen atom, a and b each independently represent an integer of 0-3 (provided that not both of a and b are 0), and m and n each independently represent an integer of 0-2, provided that the sum of (a+m) is an integer of 4 or less, and the sum of (b+n) is an integer of 4 or less).

(II) The production method according to (I) above, wherein the aromatic dihydroxy compound represented by Formula (1) is represented by Formula (1-a) below:

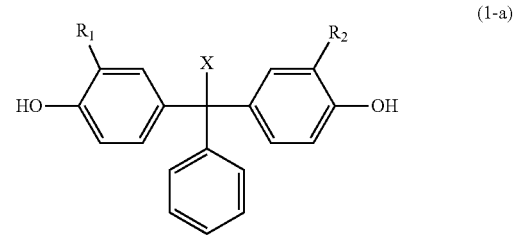

(in Formula (1-a),
$R_1$, $R_2$ and X are identical to those in Formula (1), respectively).

(III) The production method according to (I) above, wherein the compound represented by Formula (2) is represented by Formula (2-a) below:

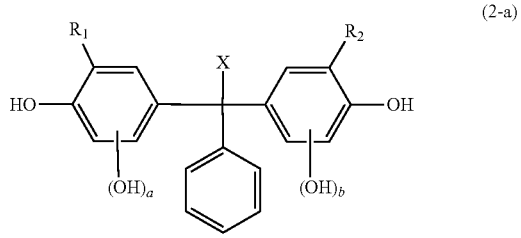

(in Formula (2-a),
R₁, R₂, a, b and X are identical to those in Formula (2), respectively).
(IV) The production method according to (I) above, wherein $R_1$ and $R_2$ are hydrogen and X is a methyl group in Formulae (1) and (2) above, and a is 1 and b is 0 in Formula (2) above.
(V) The production method according to (I) above, wherein $R_3$ is a phenyl group in Formulae (1) and (2) above.
(VI) The production method according to any one of (I)-(V) above, wherein the intrinsic viscosity of the polycarbonate resin is 0.2 dl/g to 1.0 dl/g (inclusive).
(VII) The production method according to any one of (I)-(VI) above, wherein the b* value in a 5 cm solution of a 7 mass % dichloromethane solution of the polycarbonate resin is 2.3 or less.
(VIII) The production method according to any one of (I)-(VII) above, further comprising, prior to the polymerization step, a concentration determining step for determining the concentration of the aromatic dihydroxy compound represented by Formula (1) and the concentration of the compound represented by Formula (2).
(IX) The production method according to any one of (I)-(VIII) above, further comprising an impurity removal step for at least partly removing the compound represented by Formula (2) from the raw material substance.
(X) The production method according to any one of (I)-(IX) above, wherein, in the polymerization step, the aromatic dihydroxy compound represented by Formula (1) is polymerized by an interfacial polycondensation process.
(XI) A molded body comprising a polycarbonate resin obtained by the production method according to any one of (I)-(X) above.
(XII) The molded body according to (XI) above, wherein the molded body is a film.

Advantageous Effect of the Invention

A method for producing a polycarbonate resin of the present invention is capable of producing a polycarbonate resin having superior properties. Specifically, the production method of the present invention comprises a polymerization step for polymerizing an aromatic dihydroxy compound which contains a specific kind of impurity at a low concentration, thereby ensuring production of a polycarbonate resin having superior properties.

BRIEF DESCRIPTION OF THE DRAWINGS

FIG. 1 A graph showing relationship between the concentration of the specific impurities in the raw material substances and the b* value of the generated polycarbonate resin of each of the examples and the comparative example.

MODE FOR CARRYING OUT THE INVENTION

Hereinafter, the present invention will be described in detail. Here, the present invention is not limited to the following embodiments, and may be modified in any way within a scope that has the effect of the invention.

1. Method for Producing Polycarbonate Resin

A method for producing a polycarbonate resin of the present invention comprises a polymerization step for polymerizing an aromatic dihydroxy compound represented by Formula (1) described above, where the produced polycarbonate resin contains a structural unit derived from the aromatic dihydroxy compound represented by Formula (1).

In the polymerization step, a raw material substance with reduced amount of impurities is used. Specifically, in the raw material substance, the concentration of the compound represented by Formula (2) above is 80 ppm or less relative to the total weight of the aromatic dihydroxy compound and the compound represented by Formula (2).

Hereinafter, the raw material substance, each of the steps, the produced polycarbonate resin and else of the production method of the present invention will be described.

1-1. Raw Material Substance (a) Raw Material Monomer

For production of a polycarbonate resin, a raw material substance is used for forming a structural unit of a polymer chain of the polycarbonate resin. The raw material substance preferably contains an aromatic dihydroxy compound represented by Formula (1) shown below as a raw material monomer, where the aromatic dihydroxy compound represented by Formula (1) shown below is preferably the main component of the raw material substance.

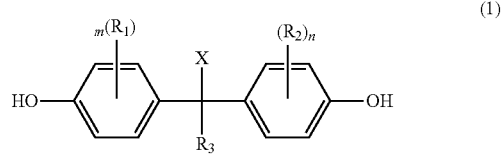

In Formula (1), $R_1$ and $R_2$ each independently represent a hydrogen atom, a halogen atom, an optionally substituted and optionally branched C1-C20 alkyl group, or an optionally substituted C6-C30 aryl group.
$R_1$ and $R_2$ are:
preferably, a hydrogen atom, an optionally substituted and optionally branched C1-C10 alkyl group, or an optionally substituted C6-C16 aryl group;
more preferably, a hydrogen atom, an optionally substituted and optionally branched C1-C6 alkyl group, or an optionally substituted C6-C12 aryl group; and
particularly preferably, a hydrogen atom, an optionally substituted and optionally branched C1-C3 alkyl group, or an optionally substituted C6-C8 aryl group.

Examples of preferable $R_1$ and $R_2$ specifically include a hydrogen atom, a methyl group, an isopropyl group, a phenyl group and a hydroxyphenyl group, where a hydrogen atom is favorable among others.

Examples of the substituent of $R_1$ and $R_2$ (when $R_1$ and $R_2$ are an alkyl group or an aryl group) include a halogen atom and a hydroxy group. Moreover, the number of the carbons mentioned above is the total number of carbons including the carbons of the substituent.

In Formula (1), $R_3$ represents a hydrogen atom, an optionally substituted and optionally branched C1-C20 alkyl group, or an optionally substituted C6-C30 aryl group.

$R_3$ is:
preferably, a hydrogen atom, an optionally substituted and optionally branched C1-C10 alkyl group, or an optionally substituted C6-C16 aryl group;
more preferably, a hydrogen atom, an optionally substituted and optionally branched C1-C6 alkyl group, or an optionally substituted C6-C12 aryl group; and
particularly preferably, a hydrogen atom, an optionally substituted and optionally branched C1-C3 alkyl group, or an optionally substituted C6-C8 aryl group.

Examples of preferable $R_3$ specifically include a hydrogen atom, a methyl group and a phenyl group, where a phenyl group is favorable among others.

Here, examples of a substituent of $R_3$ (when $R_3$ is an alkyl group or an aryl group) include a halogen atom and a hydroxy group. Moreover, the number of the carbons mentioned above is the total number of carbons including the carbons of the substituent.

In Formula (1), X represents an optionally branched C1-C20 alkyl group, C1-C20 alkynyl group, C1-C20 alkenyl group or C6-C30 aryl group, which may be substituted with a halogen atom.

X is:
preferably, an optionally substituted and optionally branched C1-C10 alkyl group, or an optionally substituted C6-C16 aryl group;
more preferably, an optionally substituted and optionally branched C1-C6 alkyl group, or an optionally substituted C6-C12 aryl group; and
particularly preferably, an optionally substituted and optionally branched C1-C3 alkyl group, or an optionally substituted C6-C8 aryl group.

Examples of preferable X specifically include a methyl group and a phenyl group, where a methyl group is favorable among others.

Here, examples of a substituent of X (when X is an alkyl group or an aryl group) include a halogen atom and a hydroxy group. Moreover, the number of the carbons mentioned above is the total number of carbons including the carbons of the substituent.

In Formula (1), m and n each independently represent an integer of 0-2. Preferably, m and n are each independently 0 or 1, and more preferably 1.

Examples of a preferable embodiment of the aromatic dihydroxy compound represented by Formula (1) include those represented by Formula (1-a) below.

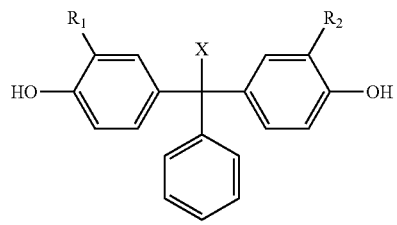

(1-a)

In Formula (1-a), $R_1$, $R_2$ and X are identical to those in Formula (1) above, respectively.

Examples of the aromatic dihydroxy compound contained as a raw material monomer in the raw material substance specifically include 1-phenyl-1,1-bis(4-hydroxyphenyl)ethane [=bisphenol AP], 2,2-bis(4-hydroxyphenyl)propane [=bisphenol A], bis(4-hydroxyphenyl)-p-diisopropylbenzene, 4,4'-dihydroxydiphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dimethyldiphenyl ether, 4,4'-dihydroxy-2,5-diethoxydiphenyl ether, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene and 2,2-bis(4-hydroxyphenyl)hexafluoropropane, where bis(4-hydroxyphenyl)alkanes are favorable, and 1-phenyl-1,1-bis(4-hydroxyphenyl)ethane [=bisphenol AP] is particularly favorable. One or more of these aromatic dihydroxy compounds may be used alone or as a mixture.

The polycarbonate resin may be either a homopolymer or a copolymer.

In addition to the aromatic dihydroxy compound, a branching agent such as 1,1,1-tris(4-hydroxyphenyl)ethane and the like may be contained in the raw material substance, as a raw material monomer for resulting a structural unit to be contained in the polymer chain of the polycarbonate resin. Note that the aromatic dihydroxy compound is preferably contained in the raw material substance in an amount of 95 mass % or more, more preferably 98 mass % or more, and particularly preferably 99 mass % or more, relative to the total weight of the raw material substance. Furthermore, the branching agent is contained in the raw material substance in an amount of, for example, less than 5 mass %, preferably less than 2 mass % and more preferably less than 1 mass %, relative to the total weight of the raw material substance.

(b) Impurities in Raw Material Substance

The raw material substance preferably contains a reduced amount of impurities.

Impurities as used herein refer to components other than the raw material monomers used for forming the structural units of the polycarbonate resin to be produced and components intentionally added for desired purposes (e.g., additives) which are contained in the raw material substance in a minute amount.

Since a compound represented by Formula (2) below is found to cause coloring and thus likely to cause deterioration of hue in the polycarbonate resin obtained by polymerization of the raw material monomer, the content thereof is preferably small in the raw material substance.

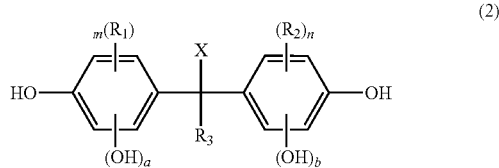

(2)

$R_1$-$R_3$ and X in Formula (2) are each independently identical to those in Formula (1) above, respectively.

a and b in Formula (2) each independently represent an integer of 0-3, provided that not both of a and b are 0. a and b in Formula (2) are preferably each independently 1-3 and more preferably 2 or 3. In the above-described impurities represented by Formula (2) with abundant phenolic hydroxy groups, the phenolic hydroxy groups partly remain unreacted after the polymerization step, where ketonization of such free hydroxy groups may cause coloring or unintentional formation of a branch chain. Therefore, it is particularly preferable to decrease the content of the impurities represented by Formula (2) with abundant phenolic hydroxy groups (for example, a triol or a polyol containing a greater number of phenolic hydroxy groups) in the raw material monomer.

In the aromatic dihydroxy compound of in Formula (1), however, compounds represented by in Formula (2) (wherein either one of a or b is 1 while the other is 0) tend to reside as impurities. Therefore, it is important to assure removal of the compounds represented by Formula (2) (wherein a is 1 and b is 0, or vice versa).

m and n in Formula (2) each independently represent an integer of 0-2, preferably 0 or 1 and more preferably 1.

In Formula (2), the sum of (a+m) is an integer of 4 or less and the sum of (b+n) is an integer of 4 or less. Moreover, in Formula (2), the sum of (a+m) and the sum of (b+n) are preferably each independently 3 or less, and more preferably 2 or less.

Accordingly, examples of the compounds represented by Formula (2) as impurities (hereinafter, also referred to as specific impurities) include compounds represented by Formula (2-a) below.

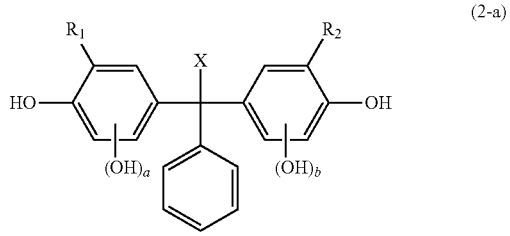

(2-a)

In Formula (2-a), $R_1$, $R_2$, a, b and X are identical to those in Formula (2), respectively.

The concentration of the specific impurities contained in the raw material substance in the polymerization step is 80 mass ppm or less relative to the total weight of the aromatic dihydroxy compound represented by Formula (1) and the specific impurities, i.e., the compound represented by Formula (2).

More preferably, the concentration of the specific impurities is preferably 75 mass ppm or less, more preferably 72 mass ppm or less, and still more preferably 70 mass ppm or less, relative to the total weight of the aromatic dihydroxy compound represented by Formula (1) and the specific impurities. Preferably, the concentration of the above-described specific impurities is, for example, 60 mass ppm or less, or 50 mass ppm or less.

If the raw material substance contains a raw material monomer other than the aromatic dihydroxy compound represented by Formula (1), such as a dihydroxy compound, the concentration of the specific impurities is preferably 80 ppm or less, more preferably 75 mass ppm or less, still more preferably 72 mass ppm or less and particularly preferably 70 mass ppm or less, relative to the total weight of the raw material substance. Preferably, the concentration of the above-described specific impurities is, for example, 60 mass ppm or less, or 50 mass ppm or less.

Since the specific impurities may cause coloring of the polycarbonate resin as described above, it is preferable to reduce the concentration thereof in the raw material substance. Therefore, setting a minimum concentration of the specific impurities in the raw material substance is not particularly meaningful, but when a raw material substance completely free of specific impurities is used to produce a polycarbonate resin, the melt tension upon shaping a film or the like from said resin may be poor. From this point of view, the minimum concentration of the specific impurities in the raw material substance is, for example, 0.01 mass ppm, 0.1 mass ppm, 1.0 mass ppm or the like.

The concentration of the specific impurities in the raw material substance is, for example, 0.01-70 mass ppm, preferably 0.1 ppm-50 mass ppm, and more preferably 1-40 mass ppm.

The raw material substance may also contain impurities other than the above-described specific impurities. Examples of compounds as impurities other than the specific impurities include those represented by Formulae (3)-(6) below.

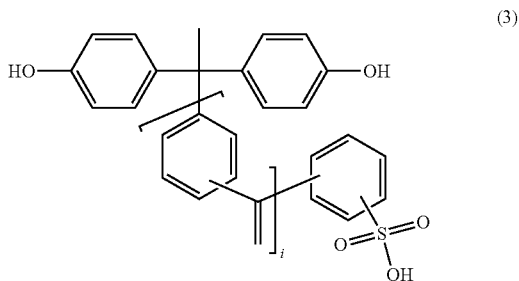

(3)

In Formula (3), i is an integer of 0-5. The presence of the compound represented by Formula (3-a) below (wherein i=0) and the compound represented by Formula (3-b) (wherein i=1) was confirmed in the raw material substance of the comparative example that will be described in detail below.

(3-a)

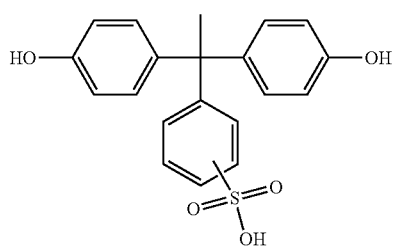

(3-b)

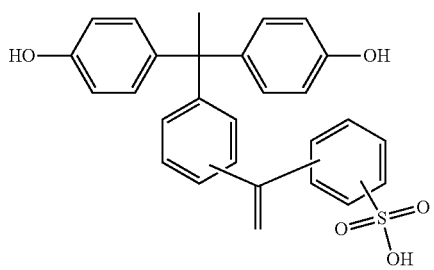

The concentration of the compound represented by Formula (3) in the raw material substance is preferably 400 mass ppm or less, more preferably 300 mass ppm or less, still more preferably 250 mass ppm or less, and particularly preferably 200 mass ppm or less, for example, 150 mass ppm or less or 120 mass ppm or less.

The compound represented by Formula (4) which may be contained in the raw material substance is as follows.

(4)

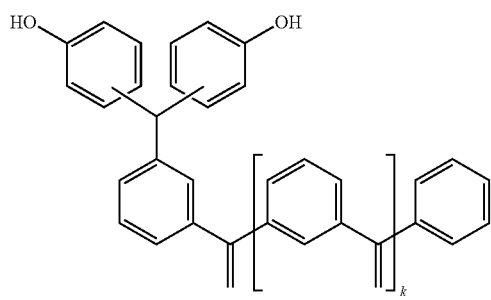

In Formula (4), k is an integer of 0-5. The presence of the compound (wherein k=0 and k=1) was confirmed in the raw material substance of an example that will be described in detail below.

The concentration of the compound represented by Formula (4) in the raw material substance is preferably 500 mass ppm or less, more preferably 400 mass ppm or less, still more preferably 300 mass ppm or less, and particularly preferably 250 mass ppm or less, for example, 200 mass ppm or less or 180 mass ppm or less.

The compound represented by Formula (5) which may be contained in the raw material substance is as follows.

(5)

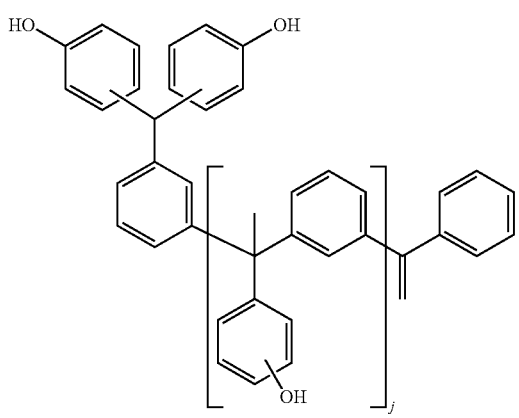

In Formula (5), j is an integer of 1-5. The presence of the compound (wherein, j=2) was confirmed in the raw material substance of an example that will be described in detail below.

The concentration of the compound represented by Formula (5) in the raw material substance is preferably 300 mass ppm or less, more preferably 250 mass ppm or less, still more preferably 200 mass ppm or less, and particularly preferably 150 mass ppm or less, for example, 120 mass ppm or less or 100 mass ppm or less.

The compound represented by Formula (6) which may be contained in the raw material substance is either one of or a mixture of the following two compounds.

(6)

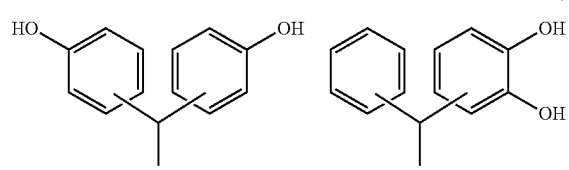

The presence of the compound represented by Formula (6) was confirmed in the raw material substance of an example that will be described in detail below.

The concentration of the compound represented by Formula (6) in the raw material substance is preferably 30 mass ppm or less, more preferably 25 mass ppm or less, still more preferably 20 mass ppm or less, and particularly preferably 15 mass ppm or less, for example, 12 mass ppm or less or 10 mass ppm or less.

As well as the specific impurities, the concentrations of the impurities other than the specific impurities are also preferably decreased in the raw material substance. Therefore, the total concentration of the impurities in the raw material substance, that is, the total concentration of the specific impurities and other impurities in the raw material substance, is preferably 2.0 mass % or less, more preferably 1.5 mass % or less, still more preferably 1.0 mass % or less, and particularly preferably 0.8 mass % (or 8,000 mass ppm) or lower, for example, 0.6 mass % (or 6,000 mass ppm) or lower or 0.5 mass % (or 5,000 mass ppm) or lower, relative to the total weight of the raw material substance.

Therefore, the purity of the raw material substance (i.e., the weight obtained by subtracting the total weight of the impurities (total weight of the specific impurities and other impurities) from the weight of the raw material substance) is preferably higher than 98.0 mass %, more preferably higher than 98.5 mass %, still more preferably higher than 99.0 mass %, and particularly preferably higher than 99.2 mass %, for example, higher than 99.4 mass % or higher than 99.5 mass %, relative to the total weight of the raw material substance.

Moreover, although setting the minimum total concentration of the impurities is not particularly meaningful, the minimum total concentration of the impurities is, for example, 0.01 mass ppm, 0.1 mass ppm or 1.0 mass ppm.

As to the impurities other than the specific impurities, it is preferable to similarly decrease the content of those with abundant phenolic hydroxy groups (for example, a triol or a polyol containing a greater number of phenolic hydroxy groups) in the raw material monomer.

(c) Components Other than Raw Material Substance

In a case where a polycarbonate resin is produced by an interfacial polycondensation process, a carbonate binder, a chain terminator, a phase transfer catalyst and the like can also be used as components other than the raw material substance.

The carbonate binder is used for binding the structural units derived from the raw material monomers by forming a carbonyl group (—C(=O)—) at the polymer chains of the polycarbonate resin. Examples of the carbonate binder include phosgene, triphosgene, carbonic acid diester, and carbonyl-based compounds such as carbon monoxide and carbon dioxide.

Examples of the carbonic acid diester include dialkyl carbonate compounds such as dimethyl carbonate, diethyl carbonate and di-tert-butyl carbonate, diphenyl carbonate, and substituted diphenyl carbonates such as di-p-tolyl carbonate, phenyl-p-tolyl carbonate and di-p-chlorophenyl carbonate. Among them, diphenyl carbonate and substituted diphenyl carbonates are favorable, and diphenyl carbonate is particularly favorable. One or more of these carbonic acid diester compounds may be used alone or as a mixture.

While the carbonate binder can be used in an excessive amount with respect to the raw material substance (raw material monomer) upon producing a polycarbonate resin, the mole ratio between the raw material substance and the carbonate binder is preferably in a range of 1:1.1 to 1:5, more preferably 1:1.2 to 1:3, and still more preferably 1:1.3 to 1:2, for example, 1:1.4.

The chain terminator is used for terminating the polymerization reaction of the raw material monomer by forming an end group of the polymer chain of the polycarbonate resin. As the chain terminator, a monohydric phenol can favorably be used.

Examples of the chain terminator include alkylphenols such as phenol, p-cresol, o-cresol, 2,4-xylenol, p-t-butyl phenol, o-allylphenol, p-allylphenol, p-hydroxystyrene, p-hydroxy-α-methylstyrene, p-propylphenol, p-cumylphenol, p-phenylphenol, o-phenylphenol, p-trifluoromethylphenol, p-nonylphenol, p-dodecylphenol, eugenol, amylphenol, hexylphenol, heptylphenol, octylphenol, nonylphenol, decylphenol, dodecylphenol, myristylphenol, palmitylphenol, stearylphenol and behenylphenol, and alkyl parahydroxybenzoates such as methyl ester, ethyl ester, propyl ester, butyl ester, amyl ester, hexyl ester and heptyl ester of parahydroxybenzoic acid. Moreover, two or more kinds of the above-mentioned monohydric phenols may be used in combination.

While the amount of the chain terminator to be used can suitably be determined according to the desired molecular weight of the polycarbonate resin, the mole ratio between the raw material substance and the chain terminator is preferably in a range of 100:1 to 10:1, more preferably 50:1 to 15:1, and still more preferably 40:1 to 20:1, for example, 25:1.

Additionally, a phase transfer catalyst is preferably used in the polymerization step of the interfacial polycondensation process. The phase transfer catalyst is mixed with the raw material monomer and the carbonate binder to give a solution, for example, an aqueous solution, to be used for the polymerization reaction. Specific examples of the phase transfer catalyst include a nitrogen-containing compound represented by Formula (7) below.

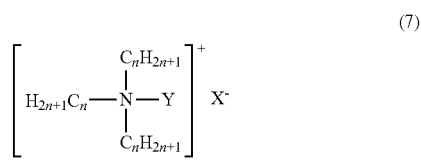

(7)

In Formula (7), n represents any of 2, 3 and 4. Y represents an ethyl group, a propyl group, a butyl group or a benzyl group. X represents Cl, Br, OH or $HSO_4$.

Specific examples of such a nitrogen-containing compound include benzyltriethylammonium chloride (TEBAC) and benzyltributylammonium chloride (TBBAC), where benzyltriethylammonium chloride (TEBAC) is favorable for use.

The phase transfer catalyst such as a nitrogen-containing compound represented by Formula (7) above is preferably used in a small amount. Specifically, the phase transfer catalyst is preferably used in an amount of less than 0.10 mass %, more preferably less than 0.05 mass %, and particularly preferably less than 0.02 mass %, relative to the total weight of the raw material substance (raw material monomer) and the phase transfer catalyst. By using the phase transfer catalyst in an appropriate amount, generation of an oligomer in the finally obtained polycarbonate resin can be prevented while the polycarbonate resin of interest is stably produced. If the phase transfer catalyst exists in an excessive amount in the reaction system of the polymerization reaction, it seems to act like a chain terminator and promotes oligomer generation.

In order to ensure the polymerization reaction to proceed, the minimum amount of the phase transfer catalyst is preferably 0.001 mass % or more, more preferably 0.005 mass % or more, and particularly preferably 0.01 mass % or more, relative to the total weight of the raw material substance (raw material monomer) and the phase transfer catalyst.

Alternatively, a polycarbonate resin can also be produced by a transesterification process. In the transesterification process, a carbonic acid diester, a catalyst such as a basic compound catalyst or a transesterification catalyst and the like are additionally used as components other than the raw material substance.

Examples of the carbonic acid diester include diphenyl carbonate, ditolyl carbonate, bis(chlorophenyl)carbonate, m-cresyl carbonate, dimethyl carbonate, diethyl carbonate, dibutyl carbonate and dicyclohexyl carbonate. Among them, diphenyl carbonate is particularly favorable in terms of reactivity and purity.

The carbonic acid diester is preferably used at a ratio of 0.60-1.30 moles, more preferably 0.70-1.20 moles and particularly preferably 1.00-1.20 moles per mole of the raw material substance (raw material monomer). This mole ratio can be adjusted to control the molecular weight of the polyester carbonate resin to lie within a favorable range.

Examples of the basic compound catalyst include an alkali metal compound, an alkaline earth metal compound and a nitrogen-containing compound.

Examples of the alkali metal compound include an organic acid salt, an inorganic salt, an oxide, a hydroxide, a hydride or an alkoxide of an alkali metal. In terms of catalyst effect, cost, distribution quantity, effect on the hue of the resin and the like, sodium carbonate and sodium bicarbonate are favorable.

Examples of the alkaline earth metal compound include an organic acid salt, an inorganic salt, an oxide, a hydroxide, a hydride or an alkoxide of an alkaline earth metal compound.

Examples of the nitrogen-containing compound include quaternary ammonium hydroxides, and salts, amines and the like thereof.

As the transesterification catalyst, a salt of zinc, tin, zirconium or lead is preferably used, which may be used alone or in combination. They may also be used in combination with the above-described alkali metal compound or alkaline earth metal compound.

Specifically, examples of the transesterification catalyst include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, zirconium acetate, and titanium tetrabutoxide. Among them, zinc acetate, zirconium acetate and titanium tetrabutoxide are favorable, and titanium tetrabutoxide is more favorable.

The basic compound catalyst and the transesterification catalyst are used in a total amount of $1 \times 10^{-9}$ to $1 \times 10^{-3}$ moles and preferably $1 \times 10^{-7}$ to $1 \times 10^{-4}$ per total mole of the raw material substance (raw material monomer).

1-2. Polymerization Step

In the polymerization step, the raw material monomer, namely, the main component of the raw material substance, is polymerized. Since the raw material substance contains the above-described aromatic dihydroxy compound, at least the aromatic dihydroxy compound is polymerized in the polymerization step.

As described above, apart from the interfacial polycondensation process, a transesterification process can be employed for the polymerization step, in which the aromatic dihydroxy compound is reacted with a carbonic acid diester in the presence of a catalyst.

The temperature of the polymerization reaction in the interfacial polycondensation process is in a range of 5° C.-60° C., more preferably 15° C.-50° C., and still more preferably 20° C.-40° C., for example, 30° C.

Furthermore, the polymerization reaction in the interfacial polycondensation process is preferably carried out at normal pressure.

As the catalyst for the polymerization reaction in the interfacial polycondensation process, an alkyl amine or the like can be used. For example, triethylamine can favorably be used as such an alkyl amine.

Furthermore, examples of the catalyst used for the polymerization reaction in the transesterification process include an alkali metal compound and an alkaline earth metal compound, where, for example, sodium bicarbonate, cesium carbonate and sodium carbonate can favorably be used.

Moreover, the polymerization reaction in the transesterification process is preferably carried out under the following conditions. Specifically, the polymerization reaction in the transesterification process is carried out at a temperature of 120° C.-350° C., preferably 180° C.-260° C. for 0.1-5 hours, preferably 0.5-3 hours. Subsequently, the reaction temperature is increased while increasing the degree of pressure reduction in the reaction system to allow reaction between the diol compound and the carbonic acid diester, so that polycondensation reaction eventually takes place at a reduced pressure of 1 mmHg or lower and a temperature of 200° C.-350° C. for 0.05-2 hours. Such reaction may be carried out in either continuous or batch mode.

The reactor used for the polymerization reaction in the transesterification process may be a vertical reactor equipped with an anchor stirring blade, a Maxblend stirring blade, a helical ribbon stirring blade or the like, a horizontal reactor equipped with a paddle blade, a lattice blade, a spectacle-shaped blade or the like, or an extruder reactor equipped with a screw. Moreover, these reactors are preferably used in a suitable combination in accordance with the viscosity of the polycarbonate resin of interest to be polymerized.

In the polymerization step, the interfacial polycondensation process (interfacial process, interfacial polymerization process) is preferably employed. This is because when a raw material monomer containing the above-described aromatic dihydroxy compound represented by Formula (1) above is polymerized by the interfacial polycondensation process, the hue of the generated polycarbonate resin is likely to be improved compared to a polycarbonate resin generated by other production method, for example, a melting method.

1-3. Concentration Determining Step

According to the method for producing a polycarbonate resin, the concentrations of the raw material substance and the impurities are preferably determined prior to the polymerization step. Specifically, a concentration determining step for determining the concentration of the aromatic dihydroxy compound in the raw material substance, namely, the purity of the raw material substance and the concentration of the specific impurities (the compound represented by Formula (2)), is preferably carried out prior to the polymerization step.

The purity of the raw material substance and the concentration of the specific impurities are determined based on the masses of the raw material substance, the raw material monomer and the specific impurities measured by a known method, and preferably determined in mass % or mass ppm relative to the mass of the raw material substance.

In the concentration determining step, the concentration of preferably at least the aromatic dihydroxy compound represented by Formula (1) of the raw material monomer is determined. Furthermore, the concentration of the impurities other than the specific impurities contained in the raw material substance is preferably determined.

1-4. Impurity Removal Step

According to the method for producing a polycarbonate resin, an impurity removal step for at least partly removing the specific impurities (i.e., the compound represented by Formula (2)) from the raw material substance is preferably carried out prior to the polymerization reaction of the raw material monomer. In the impurity removal step, the specific impurities are removed from the raw material substance based on crystallization of the raw material substance or the like. Preferably, the impurity removal step further comprises washing crystals resulting from crystallization of the raw material substance, where the steps of crystallization and washing are preferably repeated. The impurity removal step may also comprise a step of decreasing the concentration of the impurities by mixing a certain raw material substance with a raw material substance having the specific impurities at a lower concentration based on the results obtained in the above-described concentration determining step.

The impurities other than the specific impurities are also preferably removed in the impurity removal step.

The above-described impurity removal step can enhance purity of the raw material monomer in the raw material substance, thereby improving the hue of the polycarbonate resin to be produced.

Although the polycarbonate resin generated by the polymerization reaction can be purified, sufficient hue improvement may not be achieved even by such a purification step if the above-described impurities are incorporated into the polymer chains. On the other hand, the impurity removal step that targets the raw material substance can ensure removal of the impurities which may be causative of hue deterioration.

Furthermore, in the impurity removal step, impurities can be removed efficiently by referring to the purity and the concentration of the respective components determined in the concentration determining step.

2. Polycarbonate Resin

Hereinafter, a polycarbonate resin obtained by the above-described production method will be described.

2-1. Structural Unit of Polycarbonate Resin

A polycarbonate resin produced by polymerization reaction of a raw material substance containing at least an aromatic dihydroxy compound represented by Formula (1) contains a structural unit represented by Formula (1-b) below derived from said aromatic dihydroxy compound represented by Formula (1).

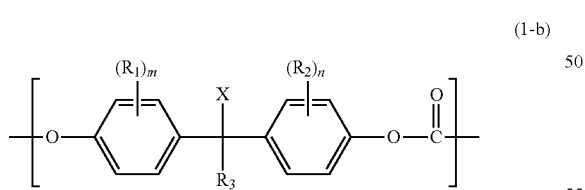

(1-b)

(In Formula (1-b),
$R_1$—$R_3$, m, n and X are identical to those in Formula (1), respectively).

If the polycarbonate resin is obtained as a copolymer, it may comprise structural units derived from a plurality of kinds of aromatic dihydroxy compounds represented by Formula (1), or may additionally comprise a structural unit other than the structural unit derived from the aromatic dihydroxy compound represented by Formula (1).

The polycarbonate resin may be either a random copolymer or a block copolymer.

2-2. Properties of Polycarbonate Resin

The polycarbonate resin preferably has an intrinsic viscosity of 0.2 dl/g to 1.0 dl/g (inclusive) as measured by a method following JIS K-7367-1 which will be described below. The intrinsic viscosity of the polycarbonate resin is more preferably 0.3 dl/g to 0.7 dl/g (inclusive), still more preferably 0.4 dl/g to 0.5 dl/g (inclusive), and particularly preferably 0.41 dl/g to 0.49 dl/g (inclusive).

The b* value of the polycarbonate resin according to JIS 7136, that is, the b* value in a 5 cm solution of a 7 mass % dichloromethane solution of the polycarbonate resin, is preferably 2.3 or lower. The b* value is more preferably 2.0 or lower, still more preferably 1.8 or lower, and particularly preferably 1.6 or lower, for example, 1.4 or lower.

Thus, a polycarbonate resin having superior hue with a decreased b* value can be produced by the above-described production method.

The polycarbonate resin preferably has a viscosity average molecular weight (Mv) in a range of 10,000-60,000, more preferably 14,000-40,000 and still more preferably 16,000-25,000.

The viscosity-average molecular weight (Mv) of the above-described polycarbonate resin is measured under the following measurement conditions.

<Conditions for Measuring Viscosity-Average Molecular Weight (Mv)>

Measurement instrument: Ubbelohde capillary viscometer
Solvent: Dichloromethane
Concentration of resin solution: 0.5 grams/deciliter
Measurement temperature: 25° C.

The measurement is carried out under the above conditions to determine the intrinsic viscosity [η] (deciliters/gram) at a Huggins constant of 0.45, which is substituted into the following equation.

$$\eta = 1.23 \times 10^{-4} \times M_v^{0.83}$$

The polycarbonate resin preferably has a glass transition temperature in a range of 100° C.-250° C. The glass transition temperature of the polycarbonate resin is more preferably 140° C.-200° C. and still more preferably 160° C.-190° C.

The glass transition temperature of the above-described polycarbonate resin is measured using a differential scanning calorimeter under the following conditions.

<Conditions for Measuring Glass Transition Temperature>

Measurement instrument: Differential scanning calorimeter (DSC-50) manufactured by Shimadzu Corporation
Rate of temperature increase: 10° C./min
Gas flow environment: Nitrogen, 20 ml/min
Pretreatment of sample: Heat melting at 300° C.

3. Molded Body

A molded body of the present invention comprises a polycarbonate resin obtained by the above-described production method.

Specific examples of the molded body include sheets and films, as well as heat molded bodies. Specifically, examples of the heat molded body include electric and electronic devices, office automation equipment, information terminal devices, mechanical parts, household appliances, vehicle parts, building material parts, various containers, recreational equipment and goods, parts of lighting apparatuses and the like, parts of various household electric appliances and the like, housings, containers, cover, storage and casings of electric apparatuses, and covers and cases of lighting apparatuses. Examples of the electric and electronic devices include personal computers, game consoles, television receivers, display devices such as liquid crystal display devices and plasma display devices, printers, copying machines, scanners, facsimile machines, electronic organizers, PDAs, electronic calculators, electronic dictionaries, cameras, video cameras, cell phones, smartphones, tablets, battery packs, storage drivers, storage readers, computer mice, numeric keypads, CD players, MD players, portable radios, and audio players.

Examples of the molded body also include illuminated signboards, liquid crystal device backlight, lighting display, traffic signboards, signboards, screens, car parts such as reflection plates and gauge parts, toys and accessories.

EXAMPLES

Hereinafter, the present invention will be described in more detail by means of examples. The present invention, however, should not be construed as being limited to the following examples.

First, a method for measuring impurities contained in a raw material substance (raw material monomer) used for producing a polycarbonate resin will be described.

<Method for Measuring Impurities in Raw Material Monomer>

(1) Preparation of Calibration Curve

As a pure product of a raw material monomer, bisphenol AP manufactured by Honshu Chemical Industry Co., Ltd. was used. 200 mg of bisphenol AP was weighed into a 10 mL volumetric flask and methanol was added thereto to make a certain volume, thereby preparing a solution (20 mg/mL methanol solution). This solution was used as the stock liquid and diluted with methanol to prepare samples for calibration curves (0.50, 1.0, 2.5, 5.0 µg/mL). These solutions were analyzed by the measurement described below to prepare calibration curves.

(2) Preparation of Measurement Solution 200 mg of the raw material monomer was weighed into a 10 mL volumetric flask and methanol was added thereto to make a certain volume, thereby preparing a solution (20 mg/mL methanol solution). This solution was analyzed by the measurement described below.

(3) Measurement

Measurement was conducted by LC-Tof-MS (ESI$^-$). Instrument and measurement conditions were as follows.

Instrument: Waters H-class
Column: Waters ACQUITY UPLC BEH C18 (inner diameter 2.1 mm, length 100 mm, particle size 1.7 µm)
Eluent: H$_2$O/MeCN=50/50 (0→5 min), 50/50→5/95 (5→10 min), 5/95 (10→15 min)
Flow rate: 0.3 mL/min
PDA: 210-500 nm
Column temperature: 40° C.
Source temperature: 120° C.
Desolvation temperature: 450° C.
Capillary voltage: 3 kV
Sampling cone voltage: 40 V
Source offset: 80
Cone gas flow: 50 L/h
Desolvation gas flow: 500 L/h
Injection volume: 0.5 µL (TIC), 1 µL (PDA chromatogram)
Ionization technique: ESI$^-$
Measurement mode: resolution
Scanned mass range: m/z 50-1000
Scan time: 0.5 s
Lock mass: m/z 554.2615 (Leucine Enkephalin)

The concentration of the impurities in each of the following examples and comparative example was determined as a concentration with respect to bisphenol AP, based on the calibration curves obtained by the above-described method.

Next, methods for measuring parameters representing the properties of the polycarbonate resin will be described.

<Intrinsic Viscosity>

The intrinsic viscosity was measured in accordance with JIS K-7367-1. Specifically, the polycarbonate resin was dissolved in dichloromethane at a concentration of 5.0 g/L to determine the intrinsic viscosity using an Ubbelohde viscometer at a temperature of 25° C. and a Huggins constant of 0.45.

<b*Value Measurement>

The b* value was measured in accordance with JIS K7136. Specifically, the polycarbonate resin was dissolved in dichloromethane at a concentration of 70 g/L. The resulting polycarbonate resin solution was placed in a 5 cm wide container to determine the b* value from the transmittance using colorimeter SD6000 manufactured by Nippon Denshoku Industries Co., Ltd.

Next, a method for producing bisphenol AP samples used as the raw material monomers of the polycarbonate resins will be described.

As the bisphenol AP samples, bisphenol AP synthesized from phenol and acetophenone, as well as commercially available bisphenol AP were used.

The bisphenol AP was synthesized by the method described in Japanese patent No. 4168646 (Japanese unexamined patent application publication No., 2003-286213). Specifically, acetophenone, phenol and butyl mercaptan as a catalyst were loaded into an autoclave equipped with a thermometer and a stirrer, and the resultant was heated while slowly stirring to maintain the temperature at 50° C.-60° C. Subsequently, the stirring speed was increased and hydrogen chloride gas was fed into the autoclave to allow reaction at an internal pressure of 0.05 MPa-0.10 MPa for 6 hours. The solvent was removed from the reaction solution to give a bisphenol AP sample.

Example 1

(Step 1)

100 g of bisphenol AP (BPAP) containing 36 ppm of specific impurities having the molecular structure represented by Formula (2-a) and 0.5 g of hydrosulfite were dissolved in 600 ml of a 9 w/w % aqueous sodium hydroxide solution. To this solution, 360 ml of dichloromethane was added and the solution temperature was kept at 20° C. while stirring, into which 47.9 g of phosgene was further blown by spending 30 minutes.

(Step 2)

At the end of phosgene blowing, 2 g of p-tert-butyl phenol (PTBP) dissolved in 50 ml of dichloromethane was added and the resultant was vigorously stirred for 7 minutes for emulsification. Then, 0.5 ml of triethylamine was added as a polymerization catalyst to allow polymerization for about 30 minutes.

(Post Process)

The polymerization solution was separated into an aqueous phase and an organic phase. The organic phase was neutralized with phosphoric acid and repeatedly washed with pure water until pH of the rinsing solution became 7.0. The organic solvent was evaporated away from the purified polycarbonate resin, thereby obtaining polycarbonate resin powder. The polycarbonate resin powder was dried at 120° C. for 24 hours to completely distill the solvent away.

(Results of Analysis)

The resulting polycarbonate resin had an intrinsic viscosity and a b* value of 0.431 dl/g and 0.84, respectively. Moreover, it had a viscosity average molecular weight (Mv) and a glass transition temperature of 20,600 and 182° C., respectively.

Example 2

A polycarbonate resin was synthesized in the same manner as Example 1 except that the amount of PTBP was changed to 2.21 g.

Formula (2-a) below (wherein either one of a or b was 1 while the other was 0, $R_1$ and $R_2$ were hydrogen and X was a methyl group).

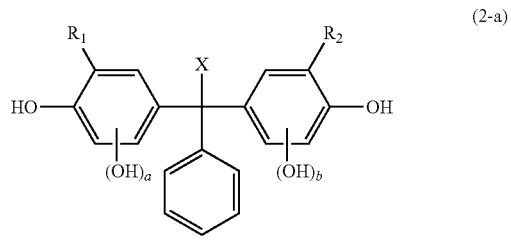

The polycarbonate resin obtained in Example 3 had a viscosity average molecular weight (Mv) and a glass transition temperature of 20,000 and 184° C., respectively. Moreover, the polycarbonate resin obtained in Comparative example had a viscosity average molecular weight (Mv) and a glass transition temperature of 19,200 and 178° C., respectively.

TABLE 1

| | | Impurities contained in raw material monomer | | | |
|---|---|---|---|---|---|
| | Purity of raw material monomer (mass %) | Concentration of compound represented by Formula (2-a) (mass ppm) | Concentration of compound represented by Formula (3) (mass ppm) | Concentration of compound represented by Formula (3-a) (mass ppm) | Concentration of compound represented by Formula (3-b) (mass ppm) |
| Example 1 | 99.91 | 38 | — | — | — |
| Example 2 | 99.91 | 38 | — | — | — |
| Example 3 | 99.55 | 67 | — | — | — |
| Comparative example | 99.6 | 82 | 113 | 76 | 37 |

| | Impurities contained in raw material monomer | | | | |
|---|---|---|---|---|---|
| | Concentration of compound represented by Formula (4) (mass ppm) | Concentration of compound represented by Formula (5) (mass ppm) | Concentration of compound represented by Formula (6) (mass ppm) | Properties of PC resin | |
| | | | | Intrinsic viscosity (dl/g) | b* value |
| Example 1 | — | — | — | 0.431 | 0.84 |
| Example 2 | — | — | — | 0.405 | 0.91 |
| Example 3 | 150 | 91 | 8.3 | 0.42 | 1.25 |
| Comparative example | — | — | — | 0.405 | 2.32 |

(Results of Analysis)

The resulting polycarbonate resin had an intrinsic viscosity and a b* value of 0.405 dl/g and 0.91, respectively. Moreover, it had a viscosity average molecular weight (Mv) and a glass transition temperature of 19,200 and 181° C., respectively.

Example 3, Comparative Example

Bisphenol AP containing specific impurities having the molecular structure represented by Formula (2-a) in amounts indicated in Table 1 were used to carry out polycarbonate resin synthesis and an analysis thereof in the same manner as Example 1. The results are shown in Table 1.

The specific impurities contained in the bisphenol AP used in Examples 1-3 and Comparative example were confirmed to have a molecular structure represented by As can be appreciated from the results of the above-described examples and comparative example, a polycarbonate resin superior in properties including hue can be achieved by the production method of the present invention.

The invention claimed is:

1. A method for producing a polycarbonate resin containing a structural unit derived from an aromatic dihydroxy compound represented by Formula (1-a) below, the method comprising
polymerizing the aromatic dihydroxy compound represented by Formula (1-a),
wherein a raw material substance, in which a concentration of a compound represented by Formula (2-a) below as impurities, is 80 ppm or less relative to the total weight of the aromatic dihydroxy compound represented by Formula (1-a) and the compound represented by Formula (2-a), is used during the polymerization:

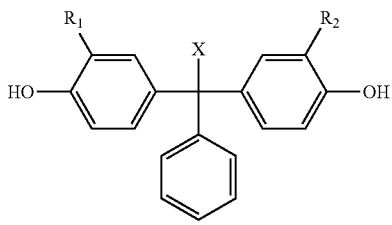

in Formula (1-a), $R_1$ and $R_2$ each independently represent a hydrogen atom, a halogen atom, an optionally substituted and optionally branched C1-C20 alkyl group, or an optionally substituted C6-C30 aryl group, and X represents an optionally branched C1-C20 alkyl group, C1-C20 alkynyl group, C1-C20 alkenyl group or C6-C30 aryl group, which may be substituted with a halogen atom,

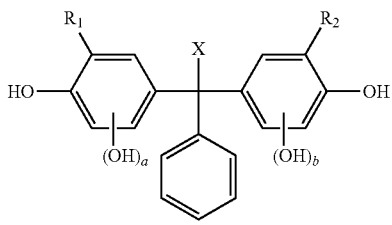

in Formula (2-a), $R_1$ and $R_2$ each independently represent a hydrogen atom, a halogen atom, an optionally substituted and optionally branched C1-C20 alkyl group, or an optionally substituted C6-C30 aryl group, X represents an optionally branched C1-C20 alkyl group, C1-C20 alkynyl group, C1-C20 alkenyl group or C6-C30 aryl group, which may be substituted with a halogen atom, a and b each independently represent an integer of 0-3, provided that not both of a and b are 0, and provided that the sum of (a+m) is an integer of 4 or less, and the sum of (b+n) is an integer of 4 or less, and wherein a 5 cm solution of a 7 mass % dichloromethane solution of the polycarbonate resin has a b* value of 2.3 or less wherein, during the polymerization, the aromatic dihydroxy compound represented by Formula (1-a) is polymerized by an interfacial polycondensation process.

2. The production method according to claim 1, wherein $R_1$ and $R_2$ are hydrogen and X is a methyl group in Formulae (1-a) and (2-a) above, and a is 1 and b is 0 in Formula (2-a) above.

3. The production method according to claim 1, wherein the intrinsic viscosity of the polycarbonate resin is 0.2 dl/g to 1.0 dl/g (inclusive).

4. The production method according to claim 1, wherein the b* value in a 5 cm solution of a 7 mass % dichloromethane solution of the polycarbonate resin is 2.0 or less.

5. The production method according to claim 1, further comprising, prior to the polymerization, determining the concentration of the aromatic dihydroxy compound represented by Formula (1-a) and the concentration of the compound represented by Formula (2-a).

6. The production method according to claim 1, further comprising at least partly removing the compound represented by Formula (2-a) from the raw material substance.